Patented May 7, 1946

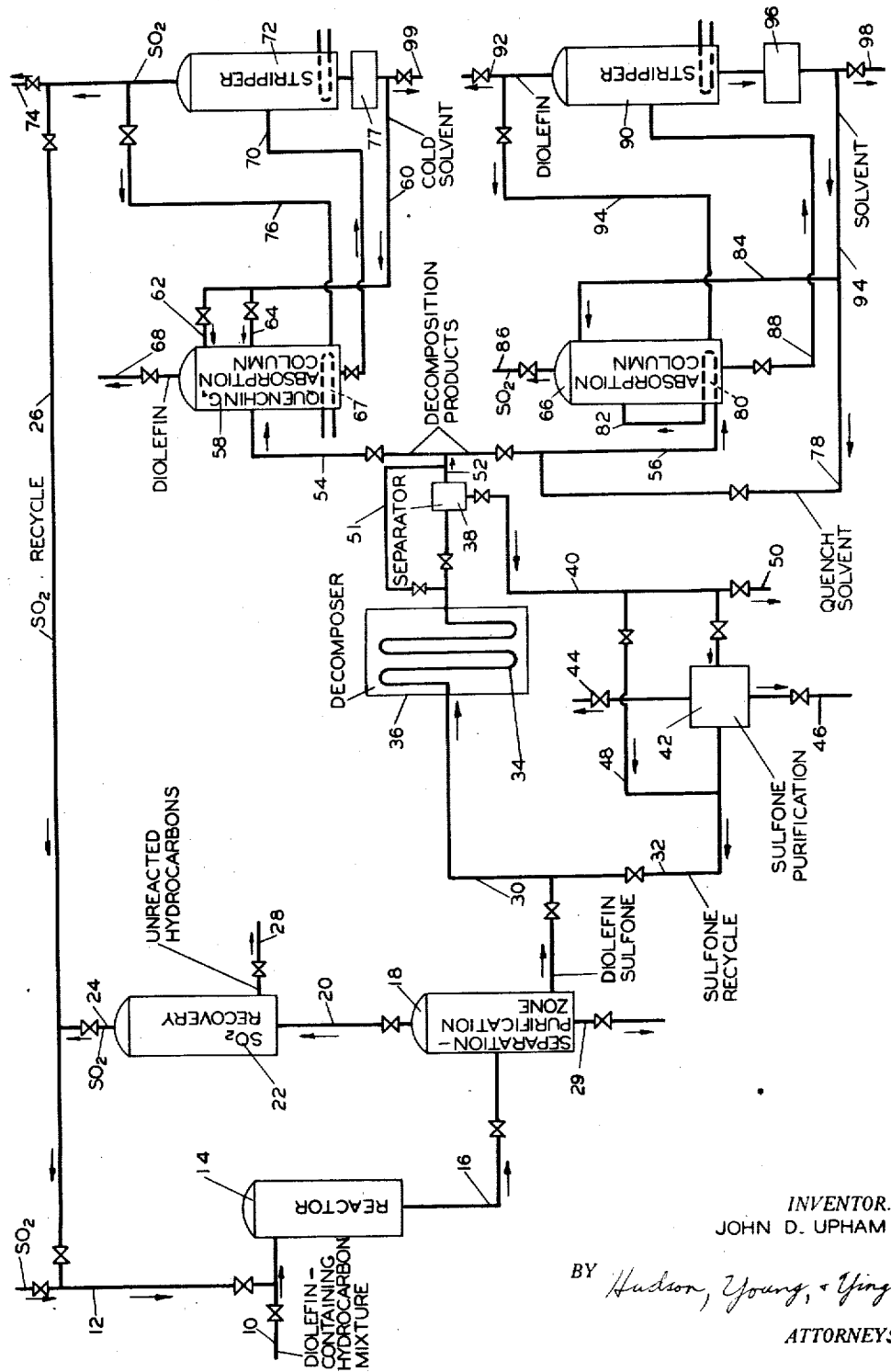

2,399,837

UNITED STATES PATENT OFFICE 2,399,837

TREATMENT OF DIOLEFINS

John D. Upham, Bartlesville, Okla., assignor to Phillips Petroleum Company, a corporation of Delaware Application January 14, 1943, Serial No. 472,373

6 Claims. (Cl. 260—681.5)

This invention relates to the separation of diolefins from admixture with other materials, more particularly from other hydrocarbons such as olefins and/or paraffins. It has special reference to such processes wherein a diolefin sulfone is formed and then decomposed into the component diolefin and sulfur dioxide, which are then separated from each other.

In the separation of diolefins from complex mixtures such as those produced by catalytic dehydrogenation, catalytic or non-catalytic cracking, dehydration or dehydrohalogenation reactions, etc., use has been made of the selective reaction of diolefins with sulfur dioxide to form sulfones. Aliphatic conjugated diolefins, such as butadiene, isoprene, piperylene, dimethylbutadiene, and the like, may be effectively separated from near-boiling compounds such as paraffin and/or monoolefin hydrocarbons by reacting the diolefin with sulfur dioxide to form diolefin monosulfone, which is then separated from unreacted material and decomposed at elevated temperatures to regenerate the diolefin, which is recovered from the decomposition mixture. Diolefin polysulfones are usually also formed to some extent, and the polysulfones may also be decomposed at elevated temperatures, although not so readily as the monosulfones, and with a considerably lower yield of diolefin. Ordinarily then, the sulfone-forming reaction is effected to give the highest proportion of monosulfone which is conveniently obtainable. Various methods of effecting the formation of diolefin sulfones have been described, as in German Patent 236,386, Staudinger (Ger. 506,839 and Br. 361,341), Perkins (Can. 329,043 and U. S. 1,993,681). Preferred methods are described in copending applications of Frederick E. Frey Ser. No. 421,068, filed November 29, 1941, and Ser. No. 423,535, filed December 18, 1941.

As stated, the diolefin sulfone is decomposed into its components at elevated temperatures, such as above 90° C. on up to about 400° C.; and preferably in the range of about 150 to 250° C., at atmospheric pressure. Under higher pressures, higher temperatures are generally required for the same rate of decomposition. Furthermore, the rate of decomposition varies with the particular sulfone being decomposed. Thus piperylene monosulfone decomposes at a somewhat faster rate than the sulfones of butadiene or isoprene at the same temperature.

It is desirable to quickly cool the decomposition products sufficiently rapidly and to a temperature sufficiently low to prevent re-reaction between the sulfur dioxide and diolefin as well as to inhibit side reactions and diolefin polymerization which might otherwise occur. This is especially so where the decomposition system is under pressure, since the sulfone-forming reaction is bimolecular, and pressure tends to increase the reaction rate at a given temperature. In view of this it has heretofore been preferred to carry out the decomposition at low pressures, such as atmospheric or less. Even so, it is desirable to cool the decomposition products rapidly to a temperature such as about 25 to 40° C.

Preferred methods of separating the diolefin from the sulfur dioxide in the decomposition mixture involve the use of solvents selective for one or the other. The gaseous mixture is contacted with the solvent at suitable conditions of temperature and pressure by conventional gas-scrubbing, extraction-rectification, and sometimes liquid-liquid extraction methods. Such operations are most conveniently effected under pressure, which means either that the decomposition must be effected under pressure, with consequent disadvantages enumerated above, or the decomposition products must be cooled and then compressed prior to treatment for separation into sulfur dioxide and diolefin.

It is an object of this invention to provide an improved process for the separation of diolefins from other hydrocarbons by reaction thereof with sulfur dioxide to form a sulfone followed by decomposition of said sulfone and separation of decomposition products. Another object is to provide an improved process of preparing aliphatic conjugated diolefins in concentrated form. Another object is to provide an improved process for effecting decomposition, and subsequent separation of the decomposition products, of diolefin sulfones. Another object is to minimize re-reaction between diolefin and sulfur dioxide in said decomposition products. A further object is to minimize undesired diolefin polymerization and other side reactions in such decomposition products. A yet further object is to provide an improved method of resolving the decomposition mixture containing diolefin and sulfur dioxide formed by the decomposition of monosulfone. Still another object is to provide for the decomposition of diolefin sulfones under pressure followed by separation under pressure of the decomposition product into its components by selective action of a solvent, while avoiding re-reaction or side reactions or the necessity for any compression of the product to be separated. A further object is to provide for the quenching and dilution of diolefin sulfone decomposition products in a novel manner in combination with selective solvent extraction of said products for the recovery of diolefin and sulfur dioxide separately. Another object is to provide a novel and efficient method for cooling and quenching the decomposition products while at the same time facilitating their separation. Other objects as well as advantages of the invention will be apparent from the accompanying disclosure and discussion.

The accompanying drawing illustrates diagrammatically the flow of materials through apparatus suitable for carrying out my invention. Two preferred arrangements are shown wherein a solvent selective for diolefin and a solvent selective for sulfur dioxide are utilized.

Briefly, in one aspect my invention contemplates decomposing diolefin sulfone by heating, preferably under pressure; immediately, by direct intermixture, contacting the hot decomposition products with a solvent selective for either sulfur dioxide or diolefin, in such quantity and at such a temperature as to cool said products to a temperature below that at which any re-reaction or other reactions would otherwise occur at the prevailing pressure; and effecting a separation of said sulfur dioxide from said diolefin by means of said solvent.

The sulfone may be derived from any source; a preferred manner of reacting sulfur dioxide selectively with a diolefin in admixture with other hydrocarbons to give diolefin monosulfone is described below. Decomposition of the sulfone may be by conventional methods, as by heating in a pot to which may be attached a spray trap, the sulfone being fed in batches or continuously to the pot and refractory products such as tar, undecomposed polysulfone, etc., being removed from the bottom of the pot. However, it is preferred to decompose the sulfone continuously by passage through a heated tube, either in the presence of or in the absence of diluents and/or carrier liquids, as disclosed in the copending application of Frederick E. Frey and Harold J. Hepp, Serial No. 423,230, filed December 16, 1941.

The decomposition products may be quenched by direct introduction into an extraction column through which a cooled selective solvent is flowing, especially if a portion of the solvent is introduced into the column at a point near the point of introduction of the hot mixture of diolefin and $SO_2$, as described in more detail below with reference to the drawing. Or, the hot decomposition products may first be admixed with cool solvent in a separate quenching and dilution zone designed to ensure rapid and intimate admixture as by baffles, etc. and the resulting mixture of diolefin, $SO_2$, and solvent then passed to a suitable extraction zone. Alternatively, and frequently preferably, the relatively cool solvent may be wholly or partly injected into the exit line from the decomposition zone, and the thus quenched mixture of decomposition products and solvent passed to a column for completing the separation.

The separation of diolefins from sulfur dioxide by means of the selective solvent is generally carried out by following established principles for this type of operation. Two methods of effecting such separation will be described below in detail with reference to the drawing. As examples of solvents selective for $SO_2$ and suitable for use as quenching and separating media in accordance with my invention may be mentioned water and alkaline liquids such as amines or alkylolamines or aqueous solutions and/or suspensions containing alkaline material such as sodium hydroxide, calcium hydroxide, basic beryllium sulfate, amines, alkylolamines, etc. Although some of these media may form decomposable compounds with $SO_2$ thus holding the $SO_2$ chemically rather than by simple physical solution, they will be termed solvents herein and it is to be understood that the terms "solvent," "solution," "dissolve," and related words used herein encompass these media and their use. As examples of solvents selective for diolefins, and suitable for use in carrying out my invention may be mentioned liquid hydrocarbons of boiling point substantially higher than the diolefin in question, preferably of essentially paraffinic nature, such as mineral seal oil, gas oil, medicinal white oil, or isooctane, nonanes, dodecanes, petroleum fractions of similar boiling range, etc.

Referring now to the drawing for a more detailed explanation of preferred methods of carrying out the process, a stream 10 usually consisting predominantly of $C_4$ hydrocarbons containing butadiene, or $C_5$ hydrocarbons containing one or more aliphatic conjugated pentadienes, or $C_6$ hydrocarbons containing one or more aliphatic conjugated hexadienes, or mixtures of any one or more of the $C_4$ to $C_6$ or higher paraffins and/or olefins with any one or more of any of the $C_4$ to $C_6$ or higher aliphatic conjugated diolefins, may be continuously admixed with from about 2 to about 10, and preferably with from about 3 to about 6, moles of sulfur dioxide from line 12 for each mole of diolefin in the hydrocarbon stream. The amount of sulfur dioxide should be maintained at the minimum satisfactory value in order to facilitate its separation from unreacted hydrocarbons at a later stage in the process. An inhibitor for preventing the formation of polysulfone may be incorporated if desired.

The mixture is heated to a temperature of from about 30° to about 225° C., the specific temperature depending upon, among other factors, whether or not an inhibitor is present. If no inhibitor is present, a temperature of from about 110° to about 225° C., and preferably from about 130° to about 200° C., is employed. If an inhibitor is used, a temperature of from about 30° to about 130° C. may be employed. Sufficient pressure is applied to maintain the reaction mixture in the dense phase. This pressure will depend somewhat upon the temperature employed but may in general vary from about 100 to about 3000 pounds per square inch. The reaction mixture is maintained at the reaction temperature for a period of time sufficiently long to allow the sulfone-forming reaction to go substantially to completion. The time will usually range from about one-half hour to about 15 hours, but may range upwardly of 15 hours to several days, and will depend upon the temperature, the concentrations, and the particular diolefins reacting.

By "dense phase," as used herein, I mean either liquid phase or, when operating above the critical temperature, a phase having a density approaching or sometimes exceeding the density of the same material in liquid phase near or slightly below the critical temperature.

The reaction may be so conducted as to allow the formation or settling out, as a bottom layer in the reaction zone 14, a solution of the monosulfone in liquid $SO_2$, and this solution may desirably be continuously removed via line 16 as formed to prevent building-up of an excessive concentration of monosulfone in the reaction zone. This draw-off may conveniently be brought to a lower pressure, preferably to the pressure in the separating zone 18 presently described.

The balance of the reaction mixture may be continuously withdrawn as an upper layer from the reaction zone to a separating zone (not shown) in which unreacted components such as paraffins and/or olefins and sulfur dioxide, with or without small amounts of diolefin, are volatilized or flashed from the mixture by releasing the pressure sufficiently. The pressure is released prior to or in the sepaarting zone to a value substantially below that in the reaction zone, say from about atmospheric to a pressure permitting condensation of the overhead product by cooling water. The hot mixture from the reactor will in some cases contain sufficient heat to cause unreacted materials to be completely vaporized away from sulfone upon release of the pressure. The temperature in the separating zone should be insufficiently high to decompose the sulfone and may conveniently be maintained at from about 80° to about 105° C. If necessary additional heat may be supplied for the separation in any suitable manner as by a heating coil in the bottom of the separating unit.

The residual material from the volatilization step and which constitutes essentially pure monosulfone may now be merged with the withdrawal from the bottom of the reaction zone in line 16 if desired, and the composite stream under pressure heated by means not shown sufficiently to drive off by flashing or volatilization the sulfur dioxide contained therein on release of pressure. The stream may conveniently be heated to from about 80° to about 105° C. while under pressure sufficient to prevent volatilization of the sulfur dioxide or any hydrocarbon without danger of decomposing the sulfone content and then have its pressure released in zone 18 to say 50 pounds per square inch, or lower, say down to atmospheric, to separate the sulfur dioxide and any dissolved hydrocarbon via line 20 as by flashing off or by distillation.

Alternatively the solution of sulfone in liquid SO₂ removed from the bottom of the reaction zone may be subjected, without intermixture with the sulfone residue from the separator, successively to pressure reduction, heating, and further pressure reduction in the same manner as described in the preceding paragraph, to separate the SO₂ content and any dissolved hydrocarbon, and the sulfone residue thus formed merged with the sulfone residue from the separator, which latter sulfone residue may have been similarly treated to separate volatiles therefrom.

Instead of withdrawing two sulfone-containing products (the separate layers) from the reactor, as described above but not shown in the drawing for the sake of simplicity, a single draw-off 16 from the reactor, preferably near the bottom thereof, may be employed. This withdrawal may then be passed in toto to separator 18 in the same manner as described above. The sulfone residue so produced is essentially free from SO₂ and is ready for further treatment as described below.

The unreacted mixture driven off in the separating zone 18 and comprising mainly paraffins and/or olefins in admixture with SO₂ may be passed via line 20 to separation means 22, which may, for example, be either an oil absorption step or a distillation column for the separation from the unreacted hydrocarbons of either SO₂ or an azeotropic thereof respectively, suitable for recycle via lines 24, 26, and 12 to reaction zone 14. Unreacted hydrocarbons may exit via line 28.

Any refractory polysulfone, tar, or other undesired material formed during the sulfone formation reaction may be removed from separator 18 via line 29. The sulfones formed in the reaction zone may be separated from unreacted products in any other way, as by decantation, but the procedures described in the foregoing are preferred.

The sulfone prepared substantially free of other materials as described above is next passed via line 30 to decomposition. The separation steps described in the foregoing are preferably effected so that the sulfone leaves separator 18 still under appreciable pressure. If this is not convenient, its pressure may be raised by pumping it into the decomposition zone by means not shown. Decomposition may also be effected at substantially atmospheric or even lower pressure, and the products quenched and separated in accordance with my invention. However, since the quenching step minimizes the objections to pressure decomposition, and emphasizes its advantages, I prefer to effect the decomposition under substantial superatmospheric pressure, ranging from say 15 pounds per square inch gage on up to 150 pounds or even considerably higher. Extremely high pressures, however, such as above about 500 pounds, generally are not useful, and accordingly are not ordinarily utilized.

In any case, the sulfone, joined by any recycled sulfone from line 32, flows from line 30 into the decomposition zone, shown on the drawing as a coil 34 heated in a furnace 36. Of course, other desired methods may be used for effecting the decomposition, but this is preferred. Decomposition in a single pass through tube 34 may be partial or complete, depending upon the residence time, temperature, and pressure. It is frequently preferred to decompose only a portion of the sulfone, separate the undecomposed sulfone from the decomposition products, and return the undecomposed sulfone, with or without purification to remove tars and the like, to the inlet of decomposing tube 34. In such case, the undecomposed sulfone, containing limited amounts of dissolved sulfur dioxide and diolefin or other volatile hydrocarbons separates as a liquid phase in separator 38. This sulfone is withdrawn from separator 38 via pipe 40 and may pass to the cleaning and purifying zone 42, where it is freed of undesired products such as tarry material, polysulfone or the like in any manner, as for example by allowing insoluble materials to settle out, or through the use of selective solvents. Dissolved sulfur dioxide and similarly readily volatile material may be removed by distillation if desired. Lines 44 and 46 are indicated for conveying gaseous and liquid or solid impurities, respectively from unit 42. Polysulfones of either aliphatic or cyclic conjugated diolefins are quite heat-stable and may be separated out in solid form in unit 42 by suitable precipitation procedure. The pure undecomposed monosulfone is then recycled via line 32 to the stream of fresh monosulfone entering the decomposition tube 34. If desired, unit 42 may be by-passed partially or entirely by line 48. In some cases the undecomposed monosulfone phase recovered from unit 38 may be so pure that use of unit 42 may be dispensed with entirely.

In case substantially complete decomposition of the sulfone is effected in one pass, residual tars, monosulfones, etc. may drop out in separator 38 and be removed via lines 40 and 50. Or, separator 38 may be by-passed entirely by line 51.

The decomposition may be effected in the presence of inert gaseous diluents such as steam, oxygen-free flue gas, methane, etc., and/or in the presence of a liquid carrier such as gas oil, or the like. Such operations are disclosed more fully in the above mentioned copending application of Frey and Hepp. Ordinarily such materials are separated out in unit 38 and recycled either through lines 40 and 32 or otherwise. In some cases they may continue on into the quenching and separation operations now to be described, particularly if the diluent or carrier is the same material which is used as a quenching and selective absorption medium. For example, steam may be used as diluent during decomposition, followed by quenching and selective absorption of $SO_2$ from the decomposition products with water. Or, a gas oil carrier may be used, followed by quenching with an additional amount of cold gas oil, followed by an extractive distillation to recover diolefin by selective solution in gas oil. When this type of operation is used, a portion of the solvent is returned for use in the decomposition step and a portion for use in the quenching step.

The temperature to be used in decomposing the sulfone will be chosen with respect to the particular diolefin being decomposed, and correlated with the residence time at the decomposition temperature, the operating pressure, the desired extent of decomposition, the presence of diluent and/or carrier, etc., as heretofore discussed. At 100 pounds pressure, I may, for example, effect the decomposition at temperatures within the range of 150 to 450° C. Proper choice will readily be made by one skilled in the art.

Regardless of the particular method of decomposition used, the hot gaseous decomposition products are quenched for the reasons and purposes herein enumerated immediately upon their exit from the decomposition zone. In the drawing, two alternative treatments are shown, wherein the decomposition products pass via line 52 either into line 54 or line 56, the former leading to treatment with a quenching and solvent medium selective for sulfur dioxide and the latter to treatment with a quenching and solvent medium selective for diolefins. The quenching is shown as being effected somewhat differently in the two treatments, but any particular quenching method can generally be used with either type of solvent.

When the hot sulfone decomposition products consisting essentially of diolefin and sulfur dioxide, are passed through line 54, they are introduced into column 58 wherein quenching and absorption of $SO_2$ are concomitantly effected by the cold solvent flowing downwardly therethrough. This cold solvent enters the top of column 58 from line 60 through line 62. Another stream of cold solvent enters column 58 from line 60 through line 64, at a point near that at which the stream of hot sulfone decomposition products enters the column. This latter stream of solvent, although not absolutely essential, aids the quenching, and avoids a local overheating in that section of the column which might otherwise occur due to the high heat input from the hot diolefin and sulfur dioxide gases.

Column 58, and column 66 referred to hereinbelow, is preferably a fractionating column of the bubble cap type, or one packed with suitable material to effect intimate contact of vapors and liquid for rectification thereof. The action occurring therein will generally be an extractive distillation, whereby the sulfur dioxide, in column 58 or the diolefin, in column 66, is selectively dissolved in the down-flowing solvent, while the other component is taken off as an overhead fraction substantially free from the absorbed component, and with or without appreciable amounts of solvent vapors, depending upon the volatility of the solvent relative to the materials being treated. The column is equipped with a reboiling coil (67 and 68 respectively in columns 58 and 66) in the kettle to strip some of the dissolved gases from the rich solvent and thus insure its freedom from the top product. The overhead product may be condensed and cooled and a portion may be returned to the top as reflux. Or, the cold solvent entering the top of the column may provide sufficient reflux cooling. In some cases, the action in the column may be a simple gas-scrubbing; or it may be a liquid-liquid extraction. In either of such cases, reboiling and/or reflux cooling may or may not be provided as required. The liquid-liquid extraction may be used particularly when higher boiling diolefins, such as pentadienes or heavier, are to be separated from sulfur dioxide, and especially when a solvent selective for sulfur dioxide, for example water, is utilized. The operation of the selective absorption unit 58, or the selective absorption unit 66, is well within the skill of the art, using the principles set forth herein.

From the top of column 58 the diolefin, substantially free of sulfur dioxide, is removed via line 68, while solvent rich in sulfur dioxide leaves the bottom via line 70, passing therethrough to stripping column 72. In column 72, which is equipped with heating means in the bottom, the rich solvent is stripped of its sulfur dioxide, which passes overhead via line 74. A portion or all of the thus-recovered $SO_2$ may be recycled via line 26 to the sulfone-forming zone as desired. Liquid $SO_2$ may be refluxed to the top of column 72 if required. A small stream of $SO_2$ may be passed from line 74 via line 76 back into column 58 at or near the bottom to aid in stripping the $SO_2$-rich solvent of any dissolved diolefin. Lean solvent leaves the bottom of stripping unit 72 and passes through cooler 77 and line 60 for re-use.

It will be seen that the hot gaseous decomposition products, immediately after leaving the sulfone decomposing zone, are rapidly quenched in column 58. This avoids the re-reaction and side reactions mentioned above, thus preventing product loss and/or contamination of either products or solvent with by-products. In addition to quenching, the solvent acts to dilute the material, thus minimizing the undesired reactions. Furthermore, selective solution of the $SO_2$ in the solvent further reduces the effective concentration of $SO_2$ in contact with diolefins. The desired results are thus effectively obtained by operating in accordance with my invention. It will also be seen that the heat in the decomposition products is not entirely wasted, since it aids the rectification taking place in column 58, supplementing the action of the reboil heating coil.

When it is desired to quench and separate the sulfone decomposition products by means of a solvent selective for diolefins, it may be done as shown in the lower part of the drawing, the decomposition products passing through conduit 56 rather than 54. Cold solvent, such as a paraffinic oil, for example, gas oil, is introduced from line 78 into conduit 56 in quantity sufficient to lower the temperature to a value at which re-reaction of diolefin and $SO_2$ and side reactions are minimized or prevented entirely.

This temperature will depend upon the particular diolefin sulfone being decomposed, the pressure, and the volume of solvent introduced relative to the volume of decomposition products, since the latter two factors govern the concentration of reactants (SO₂ and diolefin) in the quenched mixture of SO₂, diolefin, and solvent. For example, butadiene monosulfone may be decomposed at 100 lb. gage pressure at 300° C. The decomposition products, butadiene and sulfur dioxide, may then be immediately quenched by a large volume of cold solvent to say 75° C., the pressure being maintained, under which conditions no appreciable re-reaction of butadiene with SO₂ to form sulfone nor other reactions occur in the time elapsing between quenching and introduction into the column wherein separation is effected.

Returning to the drawing, the mixture of SO₂, diolefin, and solvent, is passed from line 56 via coil 80 and line 82 into column 66 at a point intermediate the top and bottom thereof, the stream being passed through coil 80 in indirect heat exchange with the bottom of the column so that heat for the kettle will be supplied by the solvent solution, which, although much below the sulfone decomposition temperature, is still relatively warm compared to the top of the column 66. In this manner the heat content of the sulfone decomposition products is utilized. Additional heat may be supplied to the kettle, but this is ordinarily not necessary. The material introduced into column 66 through line 82 meets a stream of additional solvent introduced at the top of the column through line 84. In addition to this solvent, product reflux may be supplied to the top of column 66 if required. Extraction takes place in the column and an SO₂ stream is taken off overhead from column 66 via line 86, while a fat solvent stream containing substantially all the diolefin is taken off as a kettle product via line 88 and introduced into stripper column 90, equipped with reboiler coils, reflux collection and return lines, and other auxiliary equipment. The SO₂ from line 86 may be recycled to reactor 14 or utilized otherwise if desired.

In stripper unit 90, the diolefin content of the fat solvent is separated and taken off overhead as a product via line 92. A small portion may be returned via line 94 to the bottom of column 66 to aid in removal of SO₂ from the solvent therein. Lean solvent leaves stripper 90 for reuse via line 94 in which is interposed cooler 96 for bringing the solvent to a temperature suitable for quenching and extracting purposes.

Solvent may be removed via line 98 continuously or intermittently for purification. A line 99 is provided for the same purpose in conjunction with stripper 72 described above wherein solvent selective for SO₂ is utilized. However, the effective quenching and dilution of SO₂ and diolefin provided by my invention results in very little solvent contamination.

It will be seen that advantages and results similar to those obtained in the use of solvent selective for SO₂ as described heretofore are also obtained when using solvent selective for diolefin as described in the foregoing. A very rapid quenching and dilution is effected by introducing the solvent directly into the line carrying hot decomposition products; heat contained in the decomposition products is quite effectively used by passing the resulting mixture through the reboiling coil in column 66.

While the quenching has been shown in the drawing as being effected after the sulfone decomposition products leave separator 38, this is not always required. Particularly when a gas oil or like material is used both as a carrier in the sulfone decomposition zone and as a solvent selective for diolefins in the separation system, the quenching may be done ahead of separator 38, with part or all of the resulting mixture going on to separation steps. In such case, some sulfone material may separate out in unit 38 and be recycled or withdrawn, only partial quenching with separation of a carrier-sulfone mixture in unit 38 may be used, followed by further quenching, etc. When steam is used as diluent, water may be advantageously used as the quenching medium and as solvent for SO₂ in similar manner. It is also possible to subject the sulfone decomposition products, with or without carrier or diluent, to some cooling prior to separator 38, such cooling preferably being just sufficient to enable the separation of a liquid phase comprising carrier and/or undecomposed sulfone. If this is done, the still hot gas phase from separator 38 is quenched immediately upon exit therefrom. Any diluents used during sulfone decomposition may be separated at proper points in the system depending upon the characteristics of the diluents, as will be apparent to one skilled in the art. These and other modifications are within the scope of the invention, which is to be limited only in accordance with the accompanying claims.

I claim:

1. The process of recovering an aliphatic conjugated diolefin from a monosulfone thereof which comprises thermally decomposing said monosulfone at a substantial superatmospheric pressure and immediately intimately contacting the hot gaseous decomposition products consisting essentially of said diolefin and sulfur dioxide while at the decomposition temperature and pressure by direct intermixture with a cold liquid acting both as a selective solvent for said diolefin but a non-solvent for sulfur dioxide and also as a quenching agent and thereby immediately cooling said decomposition products to a point preventing reaction and side reactions and effecting selective dissolution of all of said diolefin in said liquid while causing said sulfur dioxide to remain undissolved, said contacting step being carried out at substantially said superatmospheric pressure, and separating the resulting solution of said diolefin from said sulfur dioxide.

2. The process of claim 1 wherein said liquid is an essentially paraffinic hydrocarbon oil substantially higher-boiling than said diolefin.

3. The process of recovering butadiene from butadiene monosulfone which comprises thermally decomposing said monosulfone under substantial superatmospheric pressure and immediately intimately contacting the hot gaseous decomposition products consisting essentially of butadiene and sulfur dioxide by direct intermixture with a cold essentially paraffinic hydrocarbon oil substantially higher boiling than butadiene and thereby immediately cooling said decomposition products to at least 75° C. and effecting selective dissolution of all of said butadiene in said oil while causing said sulfur dioxide to remain undissolved, said contacting and cooling being carried out at substantially said superatmospheric pressure, and separating the resulting solution of said butadiene from said sulfur dioxide.

4. In the regeneration of aliphatic conjugated diolefin and sulfur dioxide from diolefin monosulfone, the steps which comprise thermally decomposing aliphatic conjugated diolefin monosulfone at a substantial superatmospheric pressure, directly quenching the hot gaseous effluents from the monosulfone decomposition zone with a sufficient quantity of a relatively cool solvent selective for said aliphatic conjugated diolefin but a non-solvent for sulfur dioxide to immediately reduce the temperature of said effluents to a point at which re-reaction and side reactions are prevented but insufficient to lower the temperature of the resulting effluents-solvent mixture below a temperature suitable for effecting separation thereof in a manner hereinafter described, flowing the resulting effluents-solvent mixture in indirect heat exchange with the kettle of an extractive distillation column thereby supplying heat for said column, introducing the mixture into said column at an intermediate point thereof and extractively distilling same therein, introducing additional relatively cool solvent adjacent the top of said column, and selectively recovering a solution of all of the diolefin content of said effluents in said solvent as a bottom product while removing the sulfur dioxide content of said effluents overhead, said quenching and extractively distilling steps being conducted at substantially said superatmospheric pressure employed in said decomposing step.

5. The process of recovering an aliphatic conjugated diolefin in substantially pure form from an aliphatic conjugated diolefin monosulfone which comprises heating said monosulfone under substantial superatmospheric pressure ranging from 15 to 500 pounds per square inch gage and to a temperature such as to effect decomposition of said monosulfone with the formation of a gaseous decomposition mixture consisting essentially of free sulfur dioxide and said diolefin in free form, said gaseous mixture being substantially at the decomposition pressure and temperature, withdrawing said gaseous mixture from the decomposition zone and immediately quenching same while substantially at the decomposition temperature and pressure by intimately and directly admixing same with a sufficient quantity of a cold high-boiling essentially paraffinic oil to immediately lower the temperature of said gaseous mixture to a value at which re-reaction of sulfur dioxide and diolefin and side reactions are substantially completely prevented, passing the resulting relatively warm mixture of sulfur dioxide, diolefin and paraffinic oil in indirect heat exchange with the bottom of an extractive distillation column thereby supplying heat for said column, and subsequently introducing said resulting mixture into said column at an intermediate point thereof, introducing an additional amount of said cold high-boiling essentially paraffinic oil at the top of said column, carrying out extractive distillation in said column with said paraffinic oil as a solvent and thereby effecting selective solution of said diolefin in said oil while removing the sulfur dioxide overhead, withdrawing from the bottom of said column a kettle prodduct consisting essentially of a solution of said diolefin in said oil, and stripping said kettle product to remove therefrom said diolefin in substantially pure form.

6. The process of claim 5 wherein said diolefin is butadiene, wherein said decomposition is carried out at a pressure of approximately 100 pounds per square inch gage and at a temperature of approximately 300° C., and wherein said gaseous decomposition mixture is immediately cooled in said quenching step to approximately 75° C.

JOHN D. UPHAM.

Certificate of Correction

Patent No. 2,399,837.

JOHN D. UPHAM

May 7, 1946.

It is hereby certified that errors appear in the printed specification of the above numbered patent requiring correction as follows: Page 3, first column, line 12, for "sepaarting" read *separating*; page 5, second column, line 46, claim 1, for "reaction" read *re-reaction*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.* sulfone, the steps which comprise thermally decomposing aliphatic conjugated diolefin monosulfone at a substantial superatmospheric pressure, directly quenching the hot gaseous effluents from the monosulfone decomposition zone with a sufficient quantity of a relatively cool solvent selective for said aliphatic conjugated diolefin but a non-solvent for sulfur dioxide to immediately reduce the temperature of said effluents to a point at which re-reaction and side reactions are prevented but insufficient to lower the temperature of the resulting effluents-solvent mixture below a temperature suitable for effecting separation thereof in a manner hereinafter described, flowing the resulting effluents-solvent mixture in indirect heat exchange with the kettle of an extractive distillation column thereby supplying heat for said column, introducing the mixture into said column at an intermediate point thereof and extractively distilling same therein, introducing additional relatively cool solvent adjacent the top of said column, and selectively recovering a solution of all of the diolefin content of said effluents in said solvent as a bottom product while removing the sulfur dioxide content of said effluents overhead, said quenching and extractively distilling steps being conducted at substantially said superatmospheric pressure employed in said decomposing step.

5. The process of recovering an aliphatic conjugated diolefin in substantially pure form from an aliphatic conjugated diolefin monosulfone which comprises heating said monosulfone under substantial superatmospheric pressure ranging from 15 to 500 pounds per square inch gage and to a temperature such as to effect decomposition of said monosulfone with the formation of a gaseous decomposition mixture consisting essentially of free sulfur dioxide and said diolefin in free form, said gaseous mixture being substantially at the decomposition pressure and temperature, withdrawing said gaseous mixture from the decomposition zone and immediately quenching same while substantially at the decomposition temperature and pressure by intimately and directly admixing same with a sufficient quantity of a cold high-boiling essentially paraffinic oil to immediately lower the temperature of said gaseous mixture to a value at which re-reaction of sulfur dioxide and diolefin and side reactions are substantially completely prevented, passing the resulting relatively warm mixture of sulfur dioxide, diolefin and paraffinic oil in indirect heat exchange with the bottom of an extractive distillation column thereby supplying heat for said column, and subsequently introducing said resulting mixture into said column at an intermediate point thereof, introducing an additional amount of said cold high-boiling essentially paraffinic oil at the top of said column, carrying out extractive distillation in said column with said paraffinic oil as a solvent and thereby effecting selective solution of said diolefin in said oil while removing the sulfur dioxide overhead, withdrawing from the bottom of said column a kettle product consisting essentially of a solution of said diolefin in said oil, and stripping said kettle product to remove therefrom said diolefin in substantially pure form.

6. The process of claim 5 wherein said diolefin is butadiene, wherein said decomposition is carried out at a pressure of approximately 100 pounds per square inch gage and at a temperature of approximately 300° C., and wherein said gaseous decomposition mixture is immediately cooled in said quenching step to approximately 75° C.

JOHN D. UPHAM.

---

Certificate of Correction

Patent No. 2,399,837.

JOHN D. UPHAM

May 7, 1946.

It is hereby certified that errors appear in the printed specification of the above numbered patent requiring correction as follows: Page 3, first column, line 12, for "sepaarting" read *separating*; page 5, second column, line 46, claim 1, for "reaction" read *re-reaction*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*